United States Patent
Kobayashi

(10) Patent No.: US 6,928,145 B2
(45) Date of Patent: Aug. 9, 2005

(54) RADIOGRAPHIC APPARATUS

(75) Inventor: Masaaki Kobayashi, Kokubunji-machi (JP)

(73) Assignee: Canon Kabushiki Kaisha, Tokyo (JP)

(*) Notice: Subject to any disclaimer, the term of this patent is extended or adjusted under 35 U.S.C. 154(b) by 388 days.

(21) Appl. No.: 09/770,667

(22) Filed: Jan. 29, 2001

(65) Prior Publication Data

US 2001/0040939 A1 Nov. 15, 2001

(30) Foreign Application Priority Data

Feb. 1, 2000 (JP) .................................. 2000-023773
Feb. 28, 2000 (JP) .................................. 2000-051095

(51) Int. Cl.⁷ .............................................. A61B 6/04
(52) U.S. Cl. ..................................... 378/117; 378/209
(58) Field of Search ............................... 378/208, 209, 378/117, 114–116, 177, 181, 178, 179, 180; 5/601

(56) References Cited

U.S. PATENT DOCUMENTS

| | | | |
|---|---|---|---|
| 4,468,803 A | 8/1984 | Ronci | 378/181 |
| 4,760,591 A | 7/1988 | Gallop et al. | 378/170 |
| 5,764,724 A * | 6/1998 | Ohlson | 378/177 |
| 5,996,149 A * | 12/1999 | Heimbrock et al. | 5/601 |
| 6,075,256 A | 6/2000 | Kaifu et al. | |
| 6,266,831 B1 * | 7/2001 | Heimbrock | 5/601 |

FOREIGN PATENT DOCUMENTS

| | | |
|---|---|---|
| EP | 0379629 | 8/1990 |
| JP | 08-116044 | 5/1996 |
| JP | 10-223636 | 8/1998 |
| JP | 11-082498 | 3/1999 |

* cited by examiner

*Primary Examiner*—David V. Bruce
*Assistant Examiner*—Hoon Song
(74) *Attorney, Agent, or Firm*—Fitzpatrick, Cella, Harper & Scinto

(57) ABSTRACT

There is disclosed a radiographic apparatus comprising a top plate for supporting a subject, an image receiver for receiving a radiographic image of the subject, a vertical moving mechanism for vertically moving the top plate and the image receiver, and means for limiting the action of the vertical moving mechanism according to the position relative to the top plate and/or posture of the image receiver. There is also disclosed a radiographic apparatus comprising a top plate for supporting a subject, an image receiver for receiving a radiographic image of the subject, a moving mechanism for varying the position relative to the top plate and/or posture of the image receiver, and means for limiting movement of the top plate in the predetermined direction in case the posture of the image receiver is not horizontal or limiting change in posture of the image receiver according to the position of the top plate.

21 Claims, 12 Drawing Sheets

RADIOGRAPHIC APPARATUS

BACKGROUND OF THE INVENTION

1. Field of the Invention

The present invention relates to a radiographic apparatus for obtaining a radiographic image of a subject by irradiating the subject with a radiation such as X-ray.

2. Related Background Art

The radiographic apparatus is utilized in the medical field for example for medial diagnosis of an inspected person and in the inspection field for example for non-destructive inspection of a material, and there are some types of the image receiver for receiving the radiographic image.

A first method is the photoradiographic method in which a sensitizing sheet and a photoradiographic film are used in mutual contact. In this method, when the radiation transmitted through an object enters the sensitizing sheet, a phosphor contained therein absorbs the energy of the radiation to generates fluorescence, the photoradiographic film is exposed by the fluorescence, and the radiographic image is reproduced as a visible image by developing the photoradiographic film.

A second method utilizes an image recording/reproducing apparatus provided with a radiation image detector composed of a photostimulable phosphor. When the radiation transmitted through an object enters the photostimulable phosphor, it accumulates a part of the radiation energy. Then, when the photostimulable phosphor is irradiated with visible light, the photostimulable phosphor generates an accelerated phosphorescence emission corresponding to the accumulated energy. Thus, the photostimulable phosphor accumulates the radiation image information of the object, then scanning means scans the photostimulable phosphor with excitation light such as laser light, and signal reading means photoelectrically reads the accelerated phosphorescence emission whereby the radiation image is recorded or displayed as a visible image by recording means such as a printer utilizing a recording material such as a photographic material, or by display means such as a cathode ray tube (CRT).

A third method utilizes a radiation image detector capable of detecting the radiation image on real-time basis and directly outputting a digital signal. The principle of such detector is described for example in the Japanese Patent Application Laid-Open No. 8-116044. Such digital detector has been enabled by the progress of the semiconductor technology, and comprises a scintillator and solid-state light detector which are formed in a laminated structure and in which the scintillator converts the radiation into visible light and the solid-state light detector executes photoelectric conversion of the visible light. The solid-state light detector is composed, on a quartz glass substrate, of a matrix array of solid-state light detecting elements each composed of an amorphous semiconductor film sandwiched between a transparent electroconductive film and an electroconductive film. As such radiation detector can be formed as a flat panel of a thickness of several millimeters, the image receiver can be easily made thin and light.

FIG. 1 shows an example of the configuration of the apparatus, with a bucky radiographic table to be used in the plain radiography of extremities, head, abdomen etc. of a subject S, seen in the longitudinal direction (from above the head of the subject). In such apparatus, the subject S lying on a top plate 1 is irradiated by the X-ray from a tube T positioned above, and the X-ray transmitted through the subject S is received by the radiographic image receiver 2 to obtain the radiation image.

In the medical practice sites, it is desired to obtain the images of the object from various direction with simple operations, and there is provided an apparatus shown in FIG. 2 for meeting such requirement. In such apparatus, in order to take the image on the lateral side of the subject S on the top plate 1, a cassette 3 containing a film or a photostimulable phosphor sheet is placed at a side of the subject S while the X-ray is irradiated from a lateral tube T' whereby the X-ray image transmitted through the subject S is received by the film or the photostimulable phosphor sheet in the cassette 3.

It is however desirable, if possible, to use a same image receiver in image taking from any direction, without deteriorating the safety or operability.

SUMMARY OF THE INVENTION

The object of the present invention is to provide a radiographic apparatus capable, in obtaining the radiation image of the subject with a single image receiver from plural directions and/or in plural ways (e.g. in plural postures of the subject), of securely protecting persons such as the subject and the operator present in the vicinity of the image receiver, and the image receiver or the articles in the vicinity thereof, without deteriorating the operability.

Other objects of the present invention will become apparent from the following description of the embodiments.

DESCRIPTION OF THE PREFERRED EMBODIMENTS

Now the present invention will be specified in detail by embodiments thereof with reference to the accompanying drawings. In the following description, there will be explained using a digital radiographic image detector as an example of the radiographic image receiver, but such example is not restrictive and it may be replaced by a radiographic image receiver utilizing a cassette containing a photoradiographic film or a photostimulable phosphor sheet.

Figure 1:
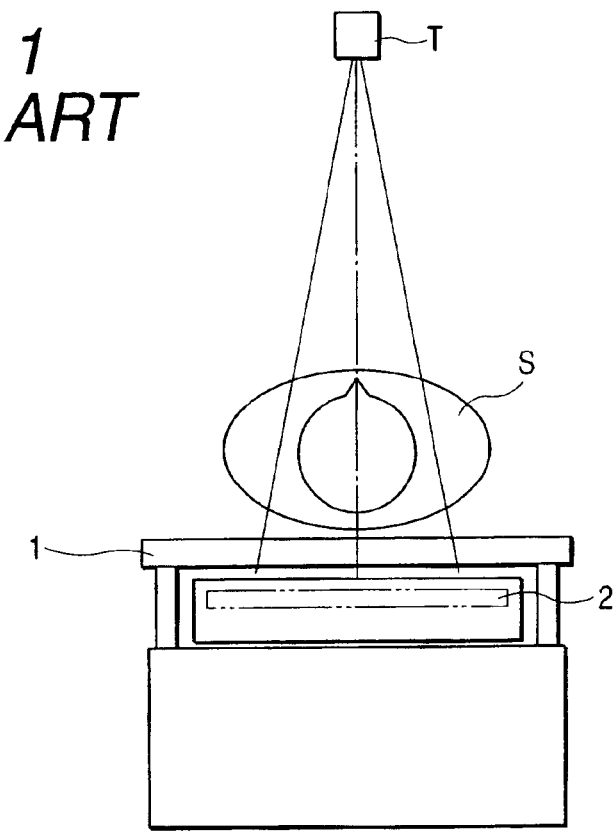
FIGS. 1 and 2 are views showing conventional configurations.
Figure 2:
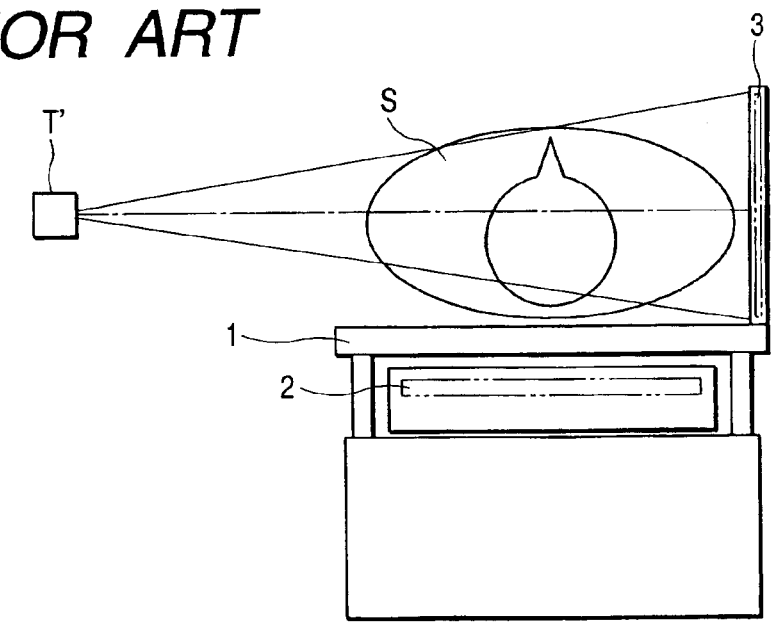
Figure 3:
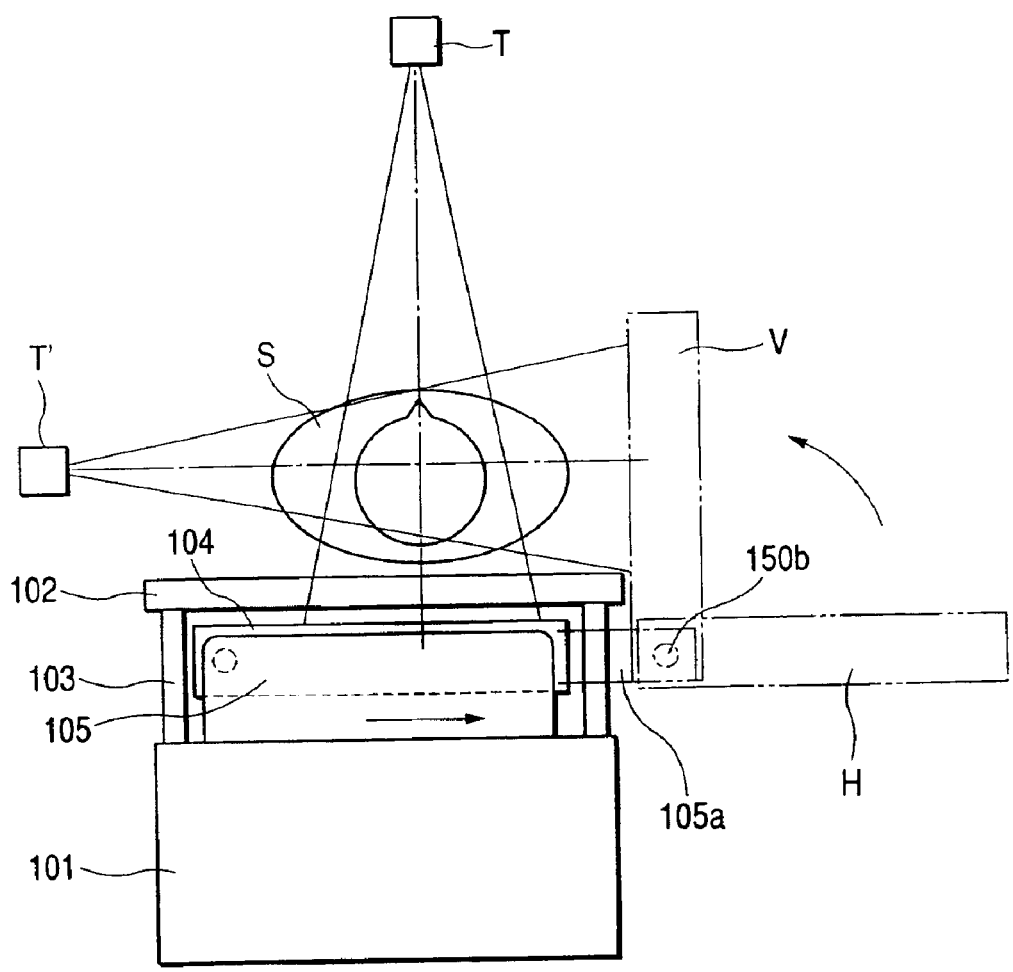
FIG. 3 is a view showing the entire configuration of a first embodiment of the radiographic apparatus.

FIG. 3 is a view showing the entire configuration of a radiographic apparatus. An X-ray tube constituting the X-ray generating apparatus can be selectively placed in a position T or T', and emits X-ray to the subject S from above or from a side thereof. A top plate 102 of the radiographic support constituting a table or a bed, etc. serves to support the subject S and is composed of acrylic resin, carbon fibers or wood. The top plate 102 is supported substantially horizontally by a support base 101 through pillars 103 at the four corners thereof. An image receiver 104 incorporating a digital X-ray detector therein is positioned below the top plate 102 but above the support base 101. For the specific example of the digital X-ray detector, reference is to be made to the Japanese Patent Application Laid-Open No. 8-116044. A moving mechanism (guide mechanism) 105 allows the radiographic engineer (operator) to extract the image receiver 104 from under the top plate 102 to an exposed position (H in FIG. 1) horizontally lateral to the subject (top plate 102) (such extracting direction being parallel to the short distance or crosswise direction of the top plate and being defined as "lateral direction"), and to rotate the image receiver to a vertical state (V in FIG. 1) after being extracted and exposed to the lateral direction of the top plate 102. The moving mechanism 105 is provided with a guide rail 105a for guiding the movement of the image receiver 104 in a direction along the substantially horizontal plane of the top plate 102, and a rotary axis 105b for guiding the rotation of the image receiver 104, extracted and exposed in the lateral direction of the top plate 102, from the horizontal state (horizontal posture) to the vertical state (vertical posture). As the image receiver 104 can be extracted from under the top plate 102 and placed in either of the horizontal state H and the vertical state V, the same image receiver 104 can be used for taking the image of the subject from different directions and also, in the horizontal state H, for taking the hand or arm of the subject by the X-ray irradiating from above, as shown in FIG. 4.

The radiographic table incorporates a vertical moving mechanism for vertically moving the top plate 102 and the image receiver 104 thereby varying the height thereof from the floor. It is thus possible to lower the top plate to a position not burdensome for the subject getting on the top plate or descending (getting down) therefrom, to move the top plate to a height easy for the operation of the helper in transferring the subject from a stretcher, or to set the top plate to a height easy for positioning the subject by the operator in the image taking operation, thereby alleviating the burden of the subject, helper or operator.

Figure 4:
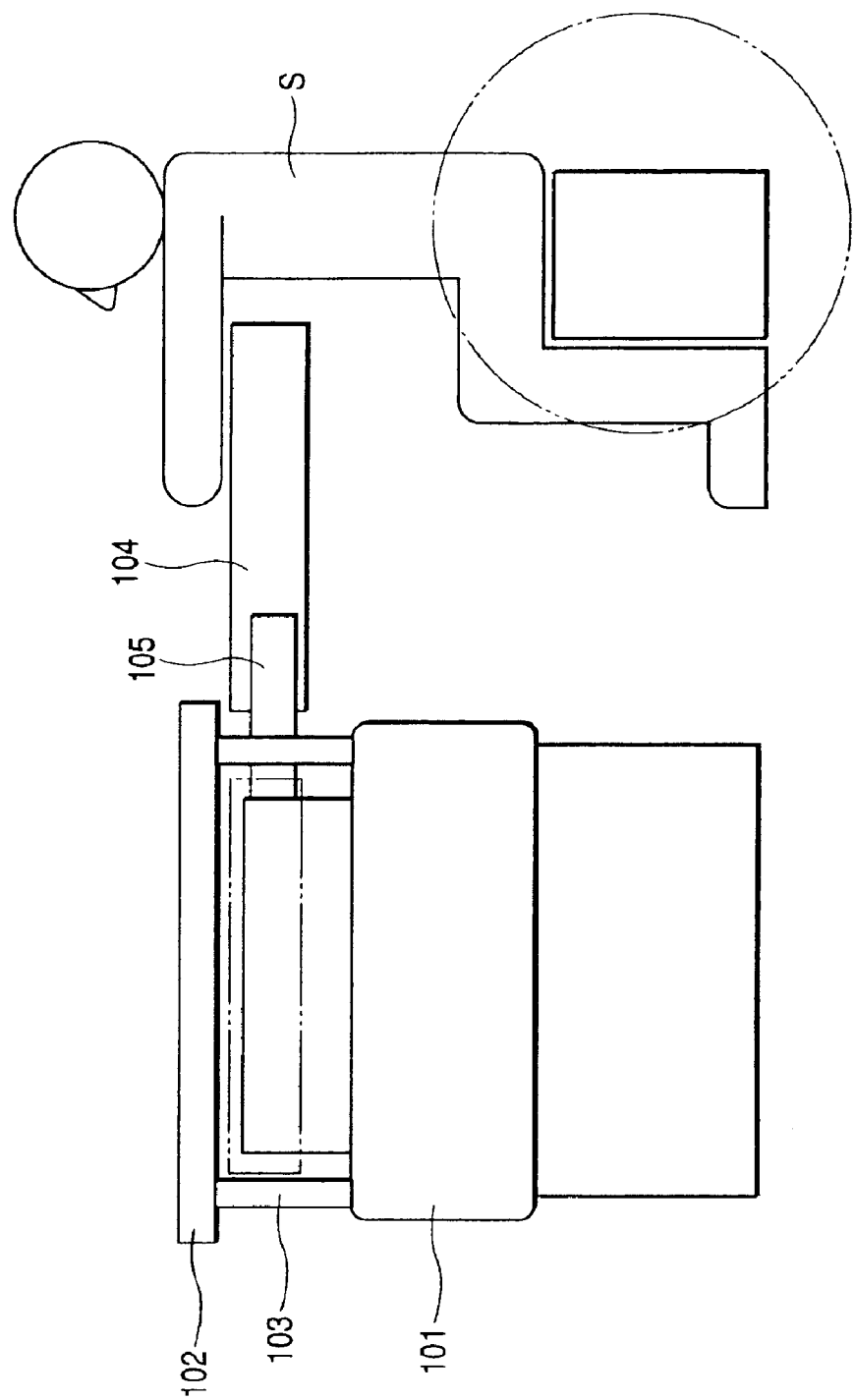
FIG. 4 is a view showing the mode of taking image of a hand or an arm of the subject.

However, in case of taking the image of the hand or arm of the subject in a state where the image receiver is horizontally extracted as shown in FIG. 4, the image taking operation is executed while the subject S is seated on a chair or a wheel chair so that the legs of the subject S, lower than the knees, are positioned below the image receiver 104. If the top plate 102 and the image receiver 104 are erroneously lowered in such state, the legs of the subject S may interfere with the image receiver and may be trapped between the image receiver and the floor. Also if an article in the radiographic room is carelessly placed under the image receiver and the image receiver is erroneously lowered, there may result interference between the image receiver and such article. The radiographic apparatus of the present embodiment is provided with a system for preventing such inconvenience, as will be explained later in detail.

Figure 5:
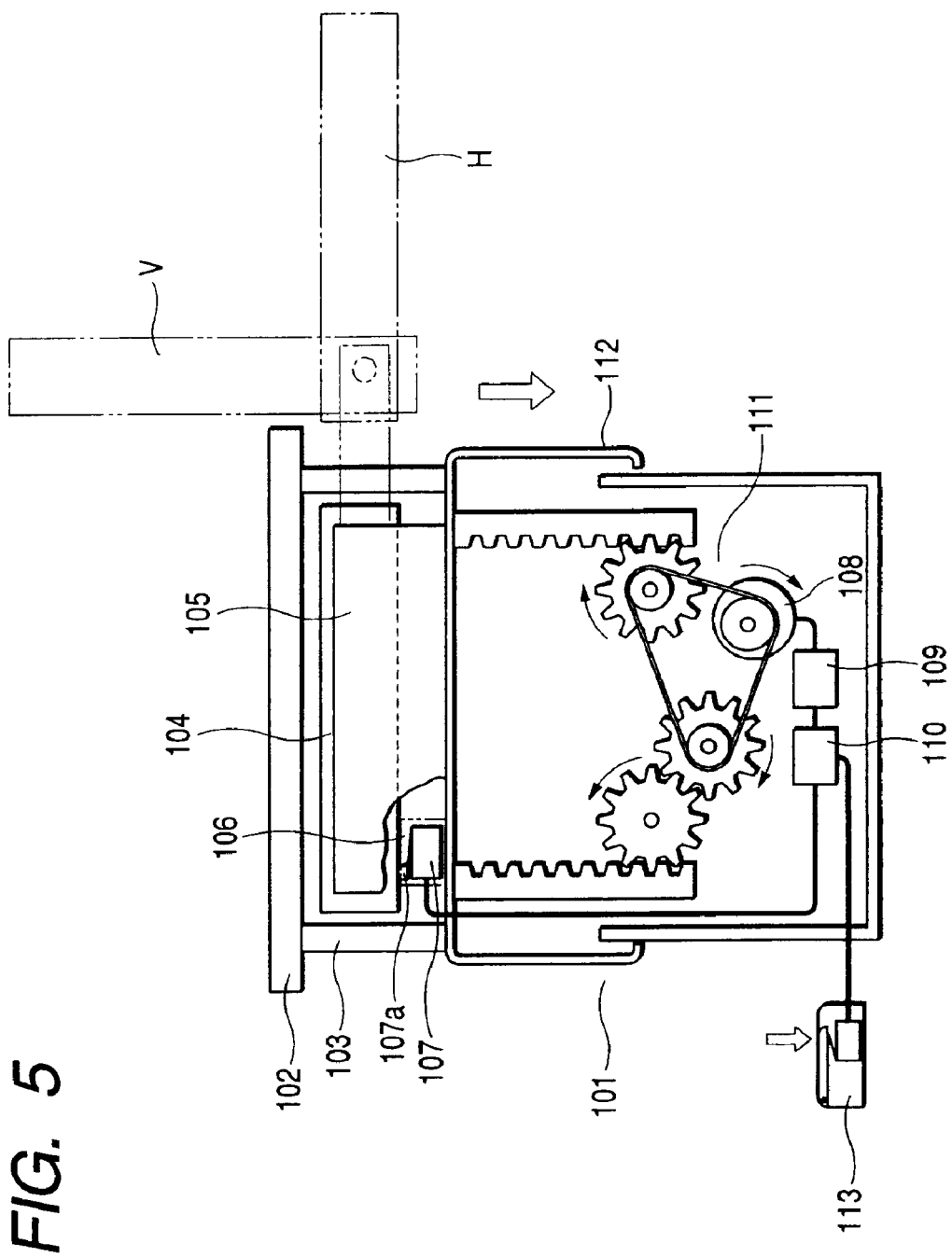
FIG. 5 is a view showing the configuration of the first embodiment.

FIG. 5 is a view showing the details of the radiographic table. Between the support base 101 and the image receiver 104, there is provided a position detector 106 for detecting whether the horizontally movable image receiver 104 is positioned under the top plate 102. The position detector 106 can comprise, for example, a microswitch 107. In such case, the microswitch 107 is so positioned as to be turned on for example when the image receiver 104 is positioned under the top plate 102, wherein a lever 107a is pressed by the bottom face of the image receiver 104 and turned off when the image receiver 104 is extracted, wherein the lever 107a is released. On the other hand, the support base 101 incorporates therein an elevator motor 108 and a driver 109 therefor, which drive the vertical moving mechanism 111 based on a signal from a controller 110 including a microprocessor, thereby integrally moving the top plate 102 and the image receiver 104 in the vertical direction through a support unit 112 of the support base 101. The controller 110 is connected to an operation switch 113 to be operated by a foot of the operator for elevating or lowering the top plate 102. The controller 110 also receives the signal of the aforementioned position detector 106, and limits the vertical movement according to such signal. More specifically, if the position detector 106 detects that the image receiver 104 is positioned under the top plate 102, the controller 110 executes the vertical moving operation according to the input from the operation switch 113. On the other hand, if the position detector 106 detects that the image receiver 104 is not positioned under the top plate 102, the controller does not execute the vertical moving operation even if the switch 113 is operated.

In case of taking the image of the subject on the top plate 102 by the X-ray from above in the above-described configuration, the operator at first lowers the top plate 102 while the image receiver 104 is housed thereunder and places the subject on the top plate 102. Then the operator elevates the top plate 102 to a height easy for the image taking operation and executes the image taking. As the position detector 104 detects that the image receiver 104 is positioned under the top plate 102 (ON state), the vertical moving operation is executed as instructed by the operator through the vertical moving switch 113.

On the other hand, in case of image taking in a state where the subject is not placed on the top plate 102, the operator in advance sets the image receiver 104 at a height easy for the image taking operation. The operator extracts the image receiver 104 from under the top plate 102 to the lateral side thereof and sets the image receiver 104 in a horizontal state where the image receiving face thereof is exposed. Then the operator positions the subject at a side of the image receiver 104 and places a body portion to be taken on the image receiving face of the image receiver 104. In such state the detection output from the position detector 106 is off to inhibit the vertical moving operation, whereby the interference between the image receiver 104 and the subject can be prevented.

The controller 110 may also be so constructed as not to limit (inhibit) both the ascending and descending operations but to allow the ascending operation only while limiting (inhibiting) the descending operation. Also the position detector 106 may comprise a sensor of other types such as non-contact type, and may be provided in another position, such as in the support base 101, image receiver 104 or moving mechanism 105.

In the following there will be explained the operation in case the image receiver 104 has moved to the vertical state from the horizontal state. In case the image receiver 104 is in the vertical state, it protrudes by a small amount only in the lateral direction from the end of the support base 101 or the top plate 102, so that the image receiver 104 does not interfere with the subject or the nearby article in the vertical moving operation. Also in case the image receiver 104 is in the vertical state, the image taking operation is often executed with the subject placed on the top plate, so that the vertical moving operation thereof should preferably not be restricted. Therefore, there is employed a logic for enabling the vertical moving operation when the image receiver 104 is in the vertical state, even if the image receiver 104 is extracted to the lateral position.

Figure 6:
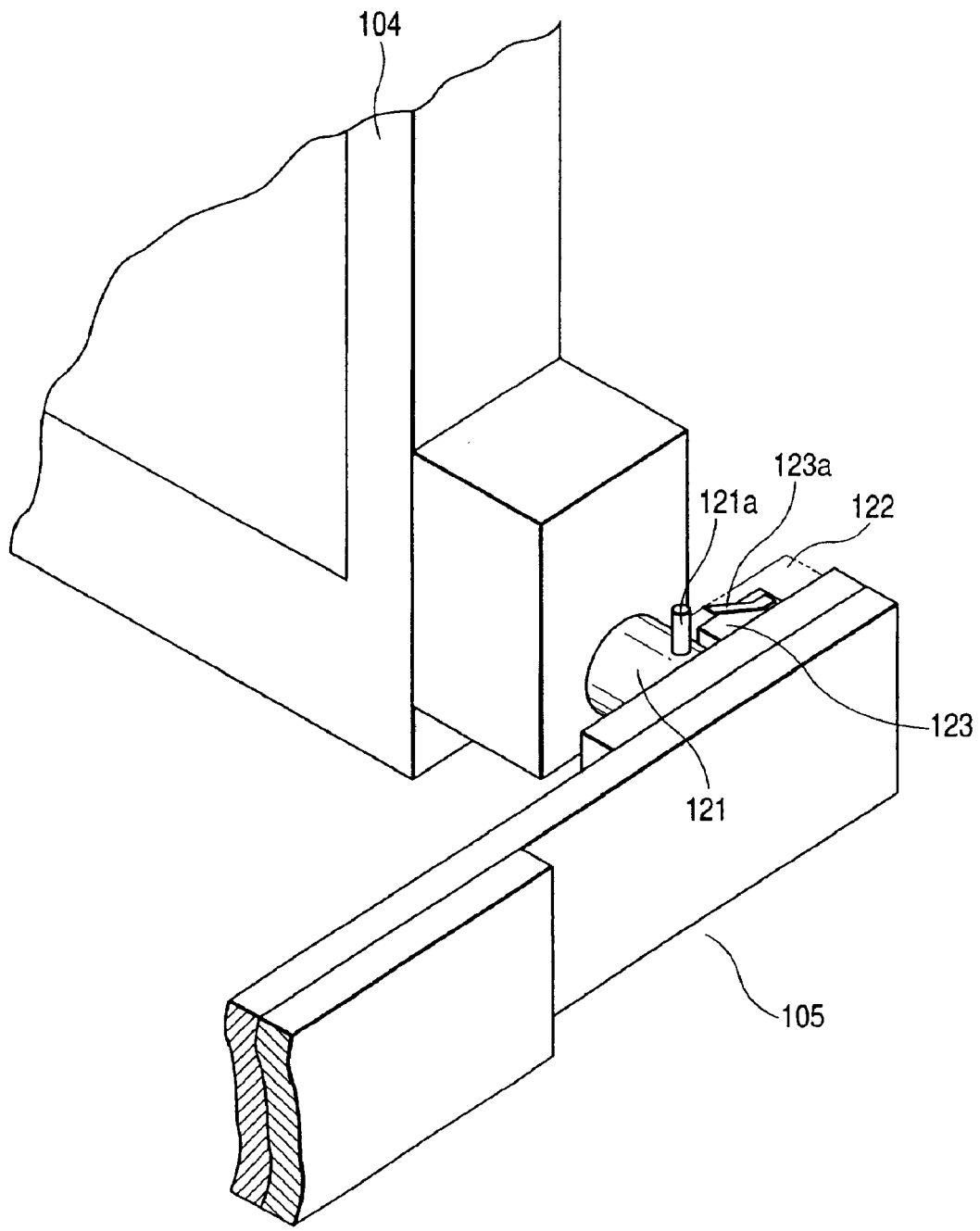
FIG. 6 is a partial view showing the configuration of the first embodiment.

FIG. 6 shows a mechanism therefor, and is a perspective view showing a rotary connecting portion of the moving mechanism 105. In the vicinity of a rotary connecting member 121 of the moving mechanism 105, there is provided a posture detector 122 comprising a microswitch or a photointerruptor, of which signal is entered into the controller 110. The posture detector 122 is composed for example in the following manner. The rotary connecting member 121 is provided with a projection 121a, and a microswitch 123 is so positioned that the projection 121a pushes a lever 123a of the microswitch 123 when the image receiver 104 is in the horizontal state but release the lever 123a when the image receiver 104 is shifted to the vertical state. Such configuration allows to detect whether the image receiver 104 is in the horizontal or vertical state. The controller 110 limits the vertical moving operation in case the image receiver 104 is extracted to the lateral position and is in the horizontal state. On the other hand, in case the image receiver 104 is shifted from the horizontal state to the vertical state, the controller 110 detects such shift through the posture detector 122 and releases the limitation to enable the vertical moving operation even if the result of detection by the position detector 106 is off, whereby the vertical moving operation is executed according to the input entered from the vertical moving switch 113.

Figure 7:
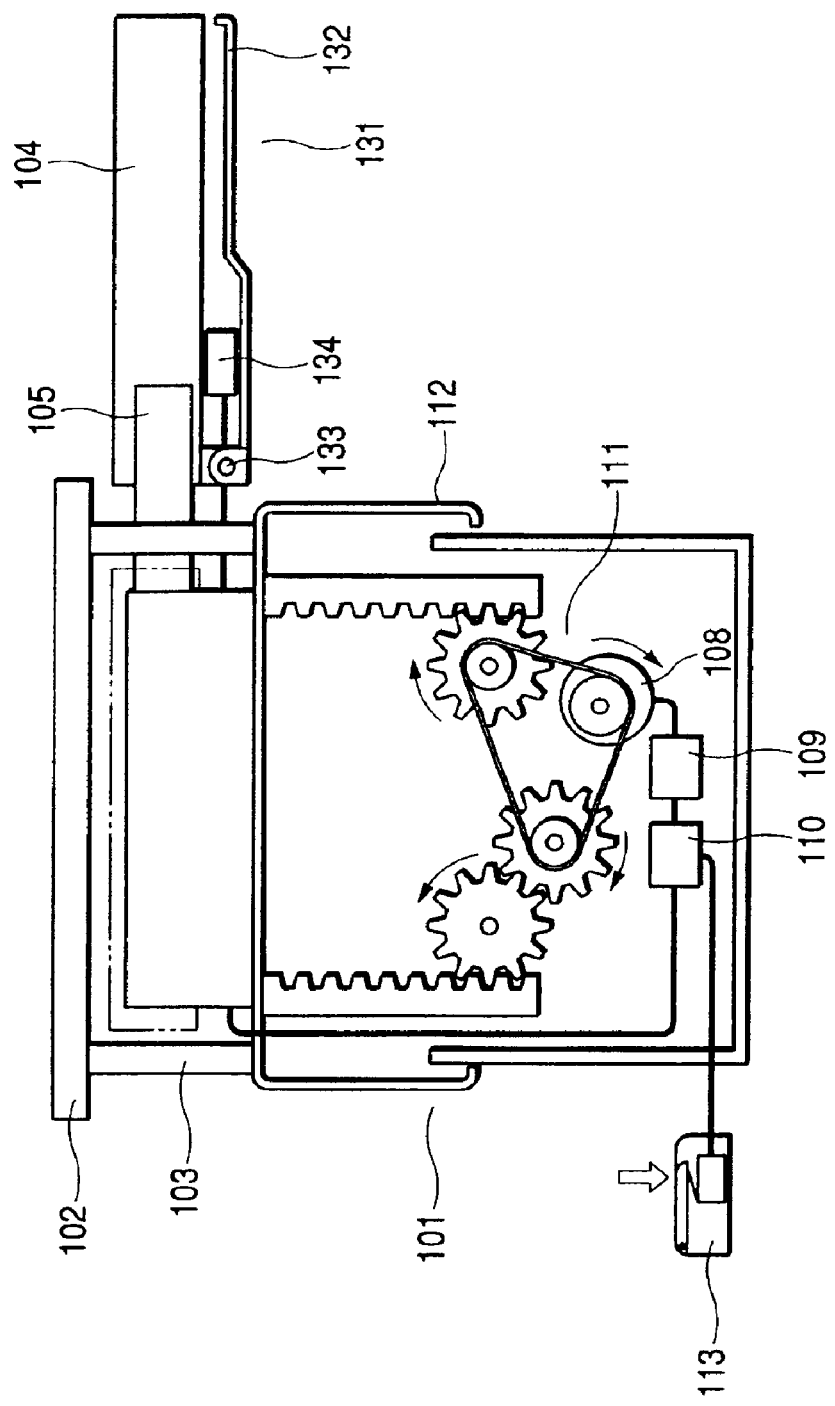
FIG. 7 is a view showing the configuration of a second embodiment.

FIG. 7 is a view showing a second embodiment of the present invention. In the foregoing embodiment, the controller 110 limits the vertical moving operation by detecting the position of the image receiver 104, but, in the present embodiment, an obstacle detector 131 is provided on the bottom face of the image receiver 104 and the controller 110 limits the vertical moving operation according to a signal from the obstacle detector 131. The obstacle detector 131 is provided with an actuation plate 132 provided so as to cover the bottom face of the image receiver 104, a fulcrum (supporting shaft) 133 for supporting the actuation plate so as to enable smooth rotation thereof in case a force is applied thereto, and a microswitch 134 for detecting the position change of the actuation plate 132. Usually the support unit 112 of the support base 101 can be arbitrarily moved vertically even while the image receiver 104 is extracted. However, in case a part of the body of the subject or an article comes into contact with the actuation plate 132 positioned on the bottom face of the image receiver 104 during the descending operation of the support unit 112, the actuation plate 132 is inclined to cause the microswitch 134 to detect the contact, and a detection signal is entered into the controller 110 whereby the controller 110 controls the driver 109 so as to immediately terminate the descending operation. It is possible to securely protect the obstacle such as the subject or the article, and the image receiver in case of contact of the obstacle detector 131 with the obstacle such as the subject or the article, by such a configuration of the obstacle detector 131 that the actuation plate 132 is rotatable at least equal to or larger than the braking distance of the actuation plate 132 from the signal detection to the actual stopping. The obstacle detector 131 is not limited to the one described in the foregoing but may comprise for example a non-contact sensor.

Also the obstacle detector of the present embodiment may be added to the apparatus shown in FIG. 5 to provide an apparatus with double safety mechanisms.

Figure 8:
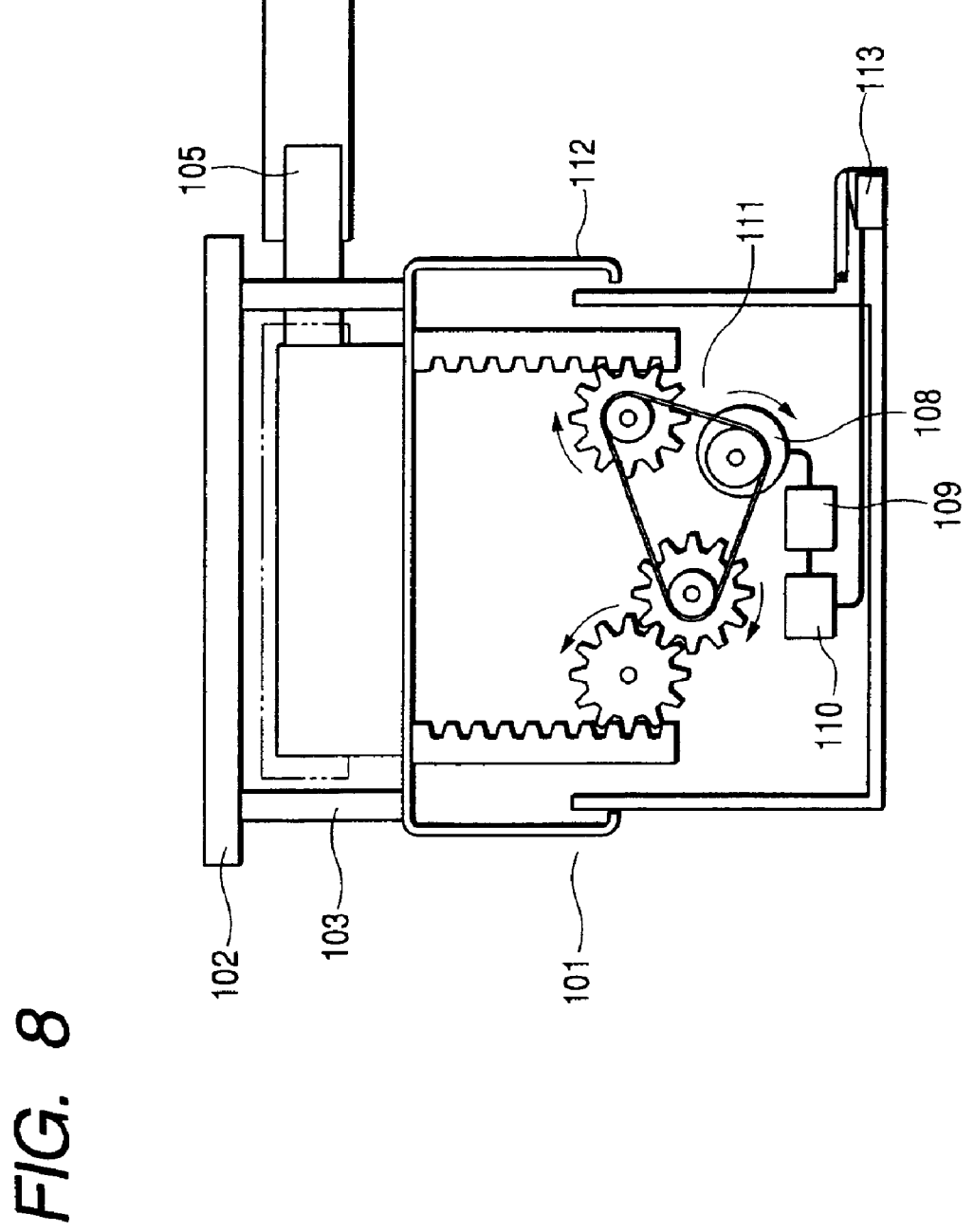
FIG. 8 is a view showing the configuration of a third embodiment.

FIG. 8 is a view showing a third embodiment of the present invention, in which the position of the operation switch, to be operated by the foot of the operator, is modified. As in the foregoing embodiments, the controller 110 receives the signal from the operation switch 113 for vertically moving the top plate 102. As shown in FIG. 8, the operation switch 113 is positioned below the extracted image receiver 104. Therefore, the operator can easily operate the operation switch 113 in a state where the image receiver 104 is positioned under the top plate 102. However, when the image receiver 104 is extracted and exposed in the horizontal state in the lateral position of the top plate 102, the switching operation becomes difficult because the foot of the operator cannot reach the operation switch 113 positioned below the image receiver 104, whereby the erroneous vertical moving operation can be prevented.

The configuration of the operation switch of the present embodiment may be added to the apparatus shown in FIG. 5 or 7 to provide an apparatus with double or triple safety mechanisms.

As explained in the foregoing, the first embodiment of the present invention limits the operation of the vertical moving mechanism according to the position and/or posture of the image receiver relative to the top plate, thereby preventing the interference of the image receiver, by the vertical moving operation thereof, with the person such as the subject or the operator and with the obstacle, and also preventing damage in various articles or in the image receiver.

The second embodiment of the present invention limits the descending operation of the vertical moving mechanism according to the detection by the obstacle detector, thereby preventing the interference of the image receiver, by the descending operation thereof, with the person such as the subject or the operator and with the obstacle, and also preventing damage in various articles or in the image receiver.

The third embodiment of the present invention positions the operation switch for controlling the vertical moving operation in the position difficult to operate when the image receiver is in the horizontal state outside the top plate, thereby preventing the erroneous operation of the operator.

Figure 9:
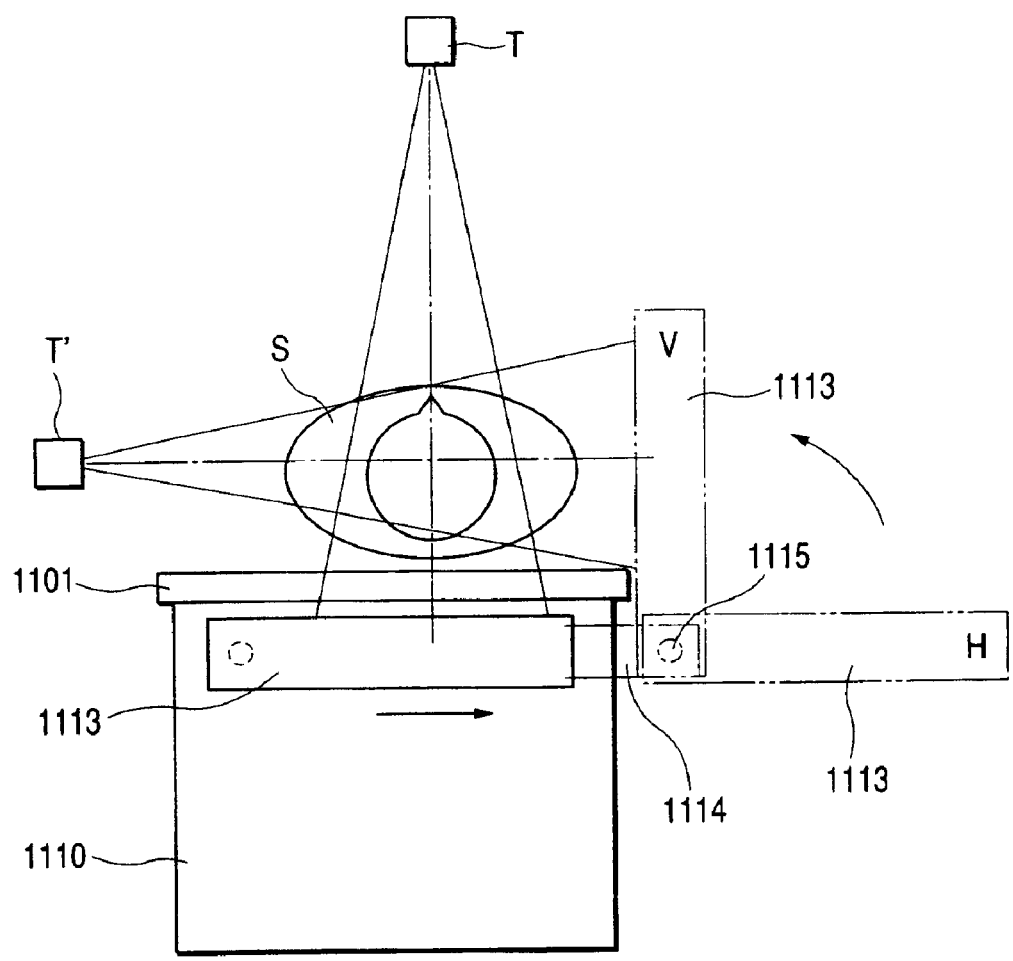
FIG. 9 is a view showing the entire configuration of a fourth embodiment of the radiographic apparatus.

FIG. 9 is a view showing the entire configuration of a fourth embodiment of the radiographic apparatus. An X-ray tube constituting the X-ray generating apparatus can be selectively placed in a position T or T', and emits X-ray to the subject S from above or from a side thereof. A top plate 1101 of the radiographic support constituting a table or a bed, etc. serves to support the subject S and is composed of acrylic resin, carbon fibers or wood. The top plate 1101 is supported on a support base 1110 movably along a substantially horizontal plane. An image receiver 1113 incorporating therein a digital X-ray detector is positioned below the top plate 1101 but above the support base 1110. For the specific example of the digital X-ray detector, reference is to be made to the Japanese Patent Application Laid-Open No. 8-116044. A moving mechanism (guide mechanism) is provided to allow the radiographic engineer (operator) to extract the image receiver 1113 from under the top plate 1101 so as to position the receiver 1113 in an exposed state (H in FIG. 9) laterally or in a horizontally lateral direction relative to the subject (top plate 1101) (in the transversal direction of the top plate and being defined as "first direction", and in the longitudinal direction of the top plate, perpendicular to the first direction, such longitudinal direction being defined as "second direction"), and to rotate the image receiver to a vertical state (V in FIG. 9) after being extracted and exposed to the lateral direction of the top plate 1101. The moving mechanism is provided with a guide mechanism 1114 consisting of a guide rail for guiding the movement of the image receiver 1113 in a direction along the substantially horizontal plane of the top plate 1101, and a rotary connecting mechanism 1115 including a rotating axis for guiding the rotation of the image receiver 1113, extracted and exposed in the lateral direction of the top plate 1101, from the horizontal state to the vertical state. As the image receiver 1113 can be extracted from under the top plate 1101 and placed in either of the horizontal state H and the vertical state V, the identical image receiver 1113 can be used for taking the image of the subject from different directions and also, in the horizontal position H, for taking the image of hand or arm of the subject by the X-ray irradiating from above, as shown in FIG. 4.

The radiographic table incorporates a vertical moving mechanism for vertically moving the top plate 1101 and the image receiver 1113 thereby varying the height thereof from the floor. It is thus possible to lower the top plate to a position not burdensome for the subject getting on the top plate or descending (getting down) therefrom, to move the top plate to a height easy for the operation of the helper in transferring the subject from a stretcher, or to set the top plate to a height easy for positioning the subject by the operator in the image taking operation, thereby alleviating the burden of the subject, helper or operator.

Now let us consider a case of taking the image of the subject from lateral direction, in a situation where the image receiver 1113 is extracted laterally and is vertically positioned (state V). In such situation, if the top plate 1101 supporting the subject is moved by a large amount in the first direction (rightward in the drawing), the lateral face of the top plate 1101 and the image receiving face of the image receiver 1113 may mutually interfere and collide. The mass of the top plate 1101 is usually in a range of 30 to 40 kgs, and the total mass may be equal to or in excess of 100 kgs if a subject of 70 kgs is placed thereon. Therefore the impact of collision is large even if the moving speed is low, and will in the worst case result in a breakage or a failure of the image receiver 1113 or the top plate 1101. On the other hand, in the rotation of the image receiver 1113 from the horizontal state (state H) to the vertical state (state V), if the image receiver 1113 is extracted incompletely (namely if a part of the image receiver 1113 in the horizontal state remains under the top plate 1101 because the top plate 1101 is moved by a large amount in the first direction (rightward in the drawing)), a lateral edge of the top plate 1101 may interfere with the image receiving face of the image receiver 1113, whereby the resulting collision in the worst case leads to a breakage or a failure of the image receiver 1113 or the top plate 1101. The apparatus of the present embodiment is provided with a system for avoiding theses drawbacks, as will be explained in the following.

Figure 10:
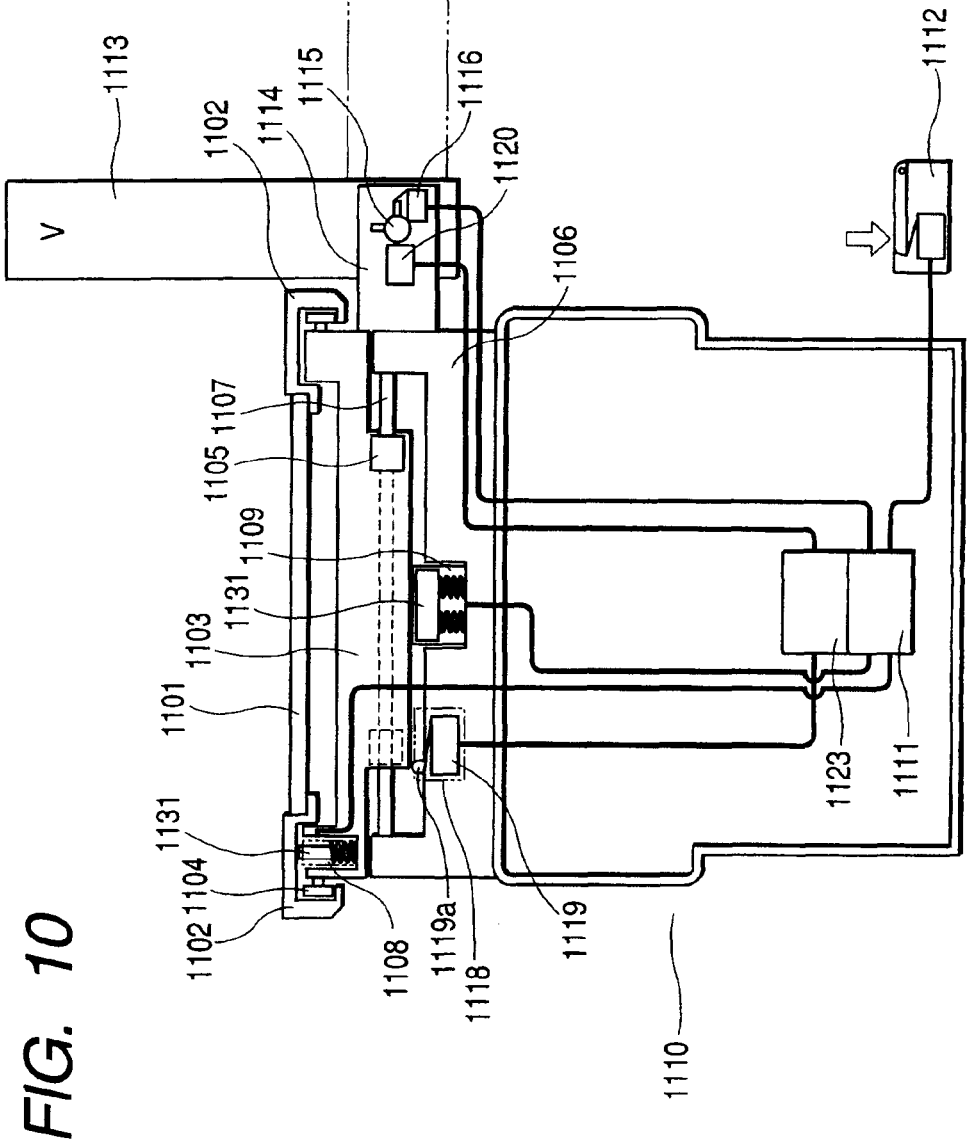
FIG. 10 is a view showing the detailed configuration of the apparatus shown in FIG. 9.

FIG. 10 is a detailed view of the apparatus shown in FIG. 9. A metal rail 1102 for guiding horizontal moving of the top plate 1101 is provided therein with a groove. The top plate 1101 can be smoothly moved in the longitudinal direction or the second direction of the top plate 1101 (front-rear direction in the drawing or direction vertical to the plane of the paper (of the drawing)) by the rotation of rollers of a linear bearing 1104 mounted on a movable frame 1103. Also under the movable frame 1103 there is mounted a linear bearing 1105 whereby the movable frame 1103 can be arbitrarily moved in the transversal or first direction of the top plate 1101 (horizontal (left-right) direction in the drawing) along a shaft 1107 mounted on a fixed frame 1106 which is fixed to the support base 1110. Utilizing the guide mechanism allowing a combination of movements respectively along the two directions which are mutually perpendicular in the horizontal plane, the operator can manually move the top plate 1101 arbitrarily in the substantially horizontal plane in a state where the subject S is placed on the top plate 1101.

On the other hand, the movable frame 1103 is provided with a locking mechanism 1108 for inhibiting the movement of the rail 1102 in the second direction, and the fixed frame 1106 is similarly provided with a locking mechanism 1109 for inhibiting the movement of the movable frame 1103 in the first direction. The locking mechanisms 1108, 1109 are respectively provided with electromagnets 1131, which can inhibit the free movement of the top plate 1101 by respectively coupling with the rail 1102 and the movable frame 1103 by magnetic force. The locked or unlocked state can be selected by a first controller 1111. In the ordinary state, the locking mechanisms 1108, 1109 are in the locked state to inhibit the movement of the top plate 1101 either in the first or second direction, and the locking mechanisms 1108, 1109 can be unlocked, when necessitated, by an operation of the operator whereby the ease and safety of the operation are secured. The unlocking or releasing of locked state is achieved by the operation, by a foot of the operator, of a foot switch 1112 including a microswitch provided in the vicinity of the lower part of the support base 1110 as shown in FIG. 10.

Figure 11:
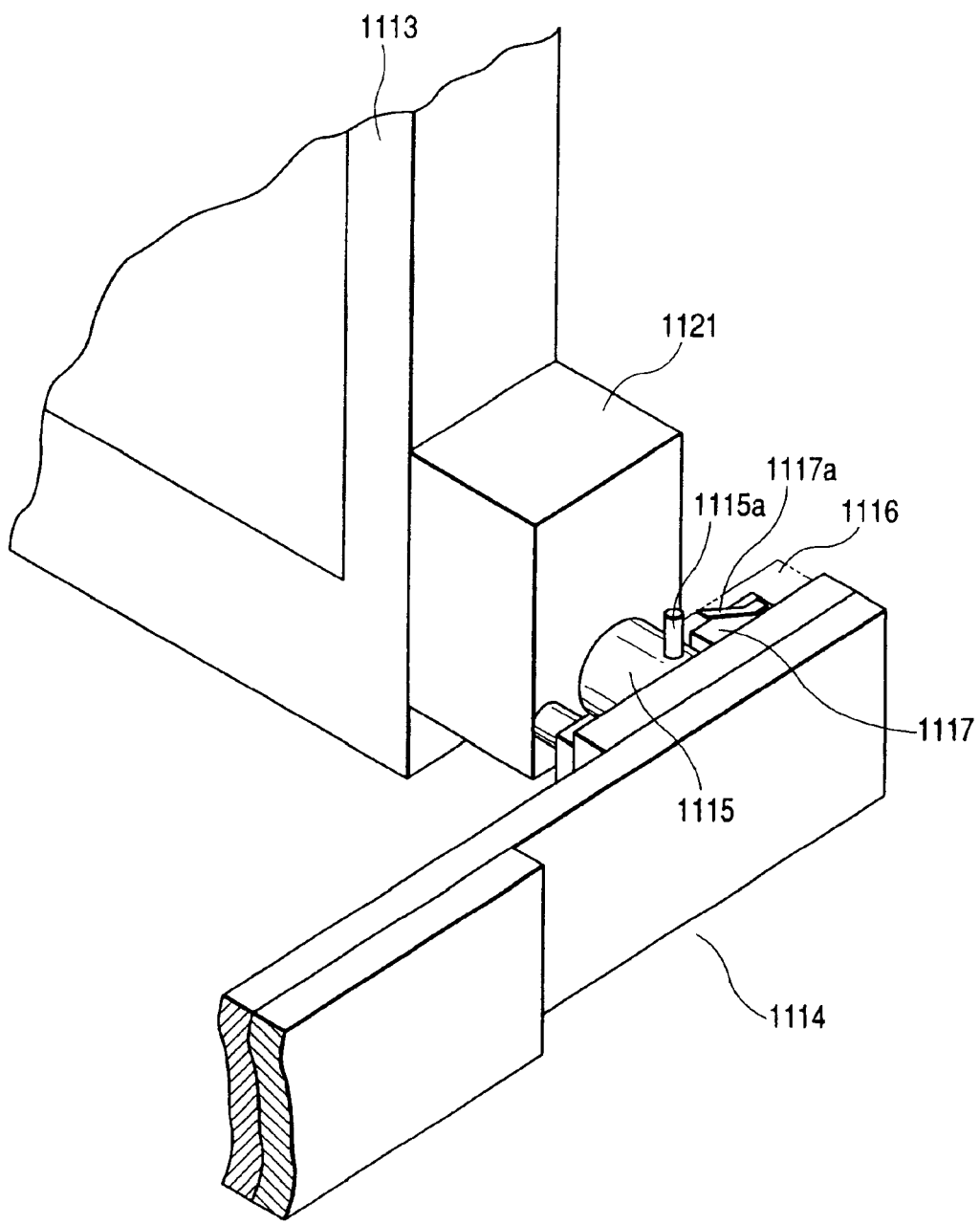
FIGS. 11 and 12 are partial views showing the configuration of the apparatus shown in FIG. 9.

On the other hand, there are provided, as explained in the foregoing, a guide mechanism 1114 and a rotary connecting member 1115 for guiding horizontal movement and rotation of the image receiver 1113 relative to the top plate 1101. In the vicinity of the rotary connecting member 1115, there is provided a posture detector 1116 comprising a microswitch or a photointerruptor. FIG. 11 is a perspective view showing the vicinity of the rotary connecting member 1115, and also showing the arrangement of the posture detector 1116. The rotary connecting member 1115 constituting the rotating axis of the image receiver 1113 is provided on a block member 1121, of which a cylindrical face is provided with a projection 1115a. A microswitch 1117 is positioned in such a manner that the projection 1115a pushes a lever 1117a of the microswitch 1117 when the image receiver 1113 is in the horizontal state, but releases the lever 1117a when the image receiver 1113 is shifted to the vertical state. Thus, there can be detected whether the image receiver 1113 is either in the horizontal state or in the vertical state, namely the posture of the image receiver relative to the top plate. The signal from the posture detector 1116 is entered, together with the signal from the aforementioned foot switch 1112, into the first controller 1111, and the input from the foot switch 1112 or the unlocking operation is limited according to the result of detection by the posture detector 1116. More specifically, the first controller 1111 does not execute the operation for unlocking the top plate 1101 even if the foot switch 1112 is operated, while the posture detector 1116 detects that the image receiver 1113 is in the vertical state. On the other hand, the first controller 1111 executes the operation for unlocking according to the input from the foot switch 1112, thereby enabling the top plate 1101 to be moved when the posture detector 1116 detects that the image receiver 1113 is in the horizontal state.

In case of image taking of the subject on the top plate 1101 by X-ray irradiation from above, the image receiver 1113 is placed under the top plate 1101 and in the horizontal state.

Such horizontal position of the image receiver 1113 is detected by the posture detector 1116 to make the operation of the foot switch 1112 effective, whereby the top plate 1112 can be moved in response to the release instruction for unlocking by the operation of the foot switch 1112 by the operator. On the other hand, in case of image taking of the subject from the lateral direction, the image receiver 1113 is fully extracted to the lateral direction of the top plate 1101 (first direction), and the posture of image receiver 1113 is then switched from the horizontal state to the vertical state. The vertical state of the image receiver 1113 is detected by the posture detector 1116, whereby the first controller 1111 does not execute releasing of locked state even if the foot switch 1112 is operated. Such control does not allow the top plate 1101 to be moved by the operator, thereby preventing erroneous collision of the top plate 1101 with the image receiver 1113.

As the top plate 1101 does not interfere with the image receiver 1113 in the movement in the second direction, the radiographic apparatus in a variation may be so constructed that, instead of limiting the releasing of locked state in both of the movement in the first and second directions of the top plate 1101, the releasing of locking is limited only in the first direction or in the locking mechanism 1109 but the releasing of locking is not limited in the locking mechanism 1108 whereby the movement in the second direction can be made regardless of the posture of the image receiver 1113. In such configuration, even if the image receiver 1113 is in the vertical state, the operator can move the top plate 1101 only in the second direction by operating the foot switch 1112, thereby varying or correcting the portion to be image-taken of the subject only in such direction.

Also, if the image receiver 1113 in the vertical state can be moved in the horizontal direction (first direction), it may collide with the lateral face of the top plate 1101. In order to avoid such situation, the moving mechanism for guiding the movement of the image receiver 1113 is provided with a locking mechanism for inhibiting the movement in the horizontal direction in case the image receiver 1113 is in the vertical state. It can be a mechanical locking mechanism or an electromagnetic locking mechanism utilizing a sensor and electromagnetic means (actuator or solenoid).

On the other hand, the image receiver 1113 may collide with the lateral face of the top plate 1101, as explained in the foregoing, in the change of posture of the image receiver 1113 by rotation thereof from the horizontal state to the vertical state, but the apparatus of the present embodiment is also provided with a mechanism for preventing such situation. Referring to FIG. 10, a position detector 1118 detects the position of the movable frame 1103. Since the positional relationship between the movable frame 1103 and the top plate 1101 changes in the second direction but does not change in the first direction by the movement of the top plate, the position detector 1118 detects, as a result, the position of the top plate 1101 in the first direction. The position detector 1118 is provided with a microswitch 1119, and a lever 1119a extending therefrom is used to detect the movement of the movable frame 1103. When the top plate 1101 is in a position not interfering with the image receiver 1113 in the vertical state, the lever 1119a is pushed by the bottom face of the movable frame 1103 to turn on the microswitch 1119. On the other hand, if the top plate 1101 is in such a position interfering with the image receiver 1113 in the vertical state, the lever 1119a is separated from the bottom face of the movable frame 1103 to turn off the microswitch 1119. Thus the position detector 1118 detects the movable range, in the first direction, of the top plate 1101 in a state where the image receiver 1113 is vertical.

Figure 12:
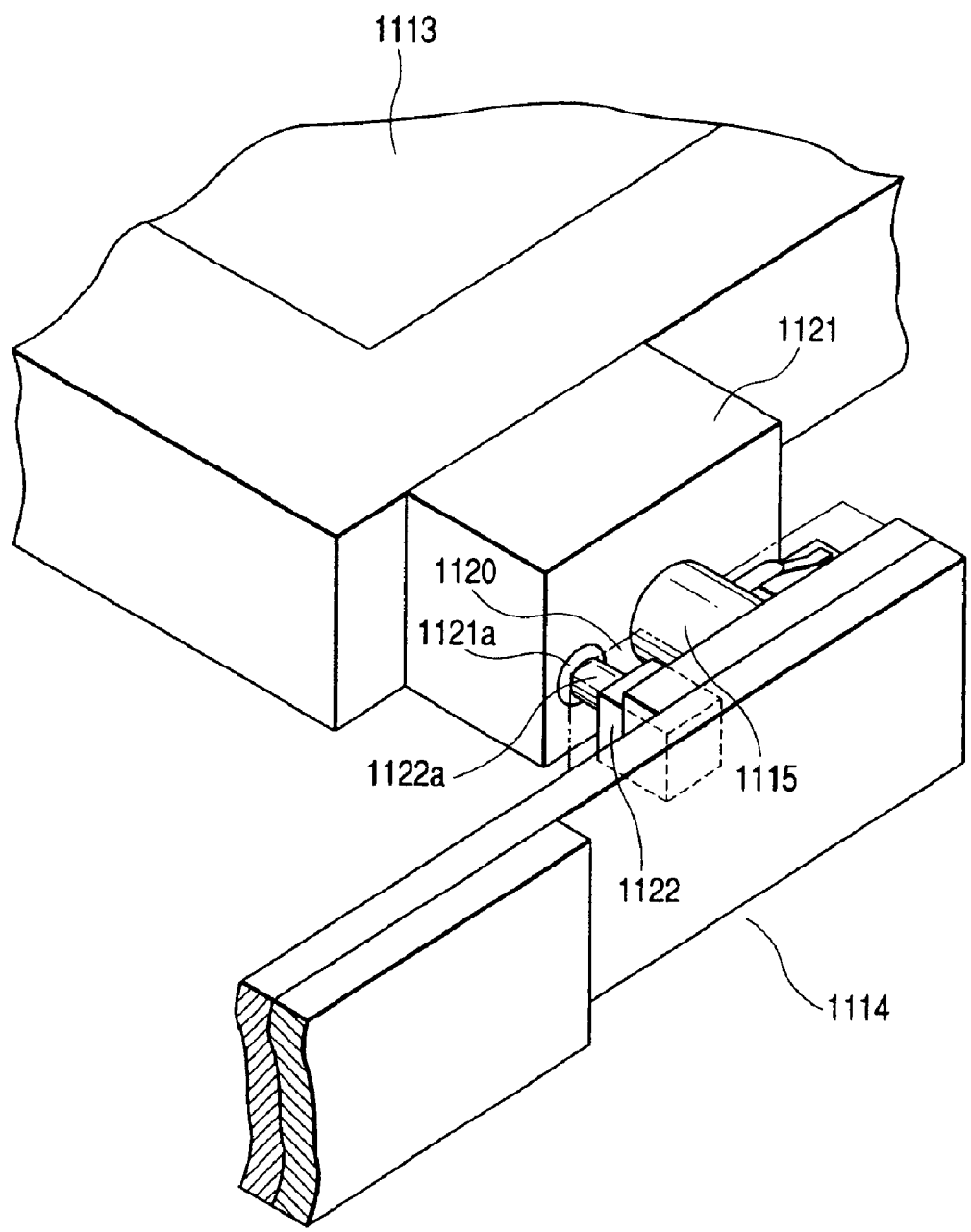

Also in the vicinity of the rotary connecting member 1115 for changing the posture of the image receiver 1113 by rotation, there is provided a rotation locking mechanism 1120, which limits the rotation of the rotary connecting member 1115 for switching the posture of the image receiver 1113 from the horizontal state to the vertical state and which is structured as shown in FIG. 12. Referring to FIG. 12, a block member 1121 mounted on the image receiver 1113 is provided with a hole 1121a for inhibiting rotation of the rotary connecting member 1115, namely that of the image receiver 1113. Opposed to such hole, the guide mechanism 1114 is provided with a solenoid 1122, of which linearly movable shaft 1122a coincides with the hole 1121a of the block member 1121 (linearly movable shaft 1122a being insertable in the hole 1121a) when the image receiver 1113 is in the horizontal state. The solenoid 1122 is driven by a second controller 1123, and the insertion of the linearly movable shaft 1122a into the hole 1121a unrotatably locks the block member 1121 whereby the image receiver 1113 cannot be shifted from the horizontal state to the vertical state.

The second controller 1123 receives a signal from the aforementioned position detector 1118 and controls the rotary locking mechanism 1120 based on the detection by the position detector 1118. When the position detector 1118 is turned on, namely when the top plate 1101 is in a position not interfering with the image receiver 1113 as shown in FIG. 10, the solenoid 1122 is controlled by the second controller 1123 to release the lock of the rotation whereby the operator can, if necessary, change the posture of the image receiver 1113 from the horizontal state to the vertical state. On the other hand, when the position detector 1118 is turned off, namely when the top plate 1101 is in a position interfering with the image receiver 1113, the solenoid 1122 is controlled by the second controller 1123 to lock the rotation whereby the operator cannot change the posture of the image receiver 1113 and the lateral face (rail 1102) of the top plate 1101 does not interfere with the image receiver 1113. In such case, by moving the top plate 1101 to a position not interfering with the image receiver 1113, the solenoid 1122 is controlled by the second controller 1123 to release the lock of the rotation, whereby the posture of the image receiver 1113 can be changed to the vertical state.

In the above-described configuration, the top plate 1101 is completely locked at least in the first direction when the image receiver 1113 is in the vertical state, but it is also possible to enter the signal of the position detector 1118 into the first controller 1111 and to cause the first controller to control the locking mechanism 1109 in such a manner that the top plate 1101 cannot enter a range causing interference with the image receiver 1113 but can move both in the first and second directions outside such range. Such control can be realized by a logic for activating the locking mechanism 1109 when the microswitch 1119 of the position detector 1118 is turned off. Such configuration widens the movable range of the top plate 1101 even when the image receiver 1113 is in the vertical state, thereby facilitating the positioning of the subject.

Figure 13:
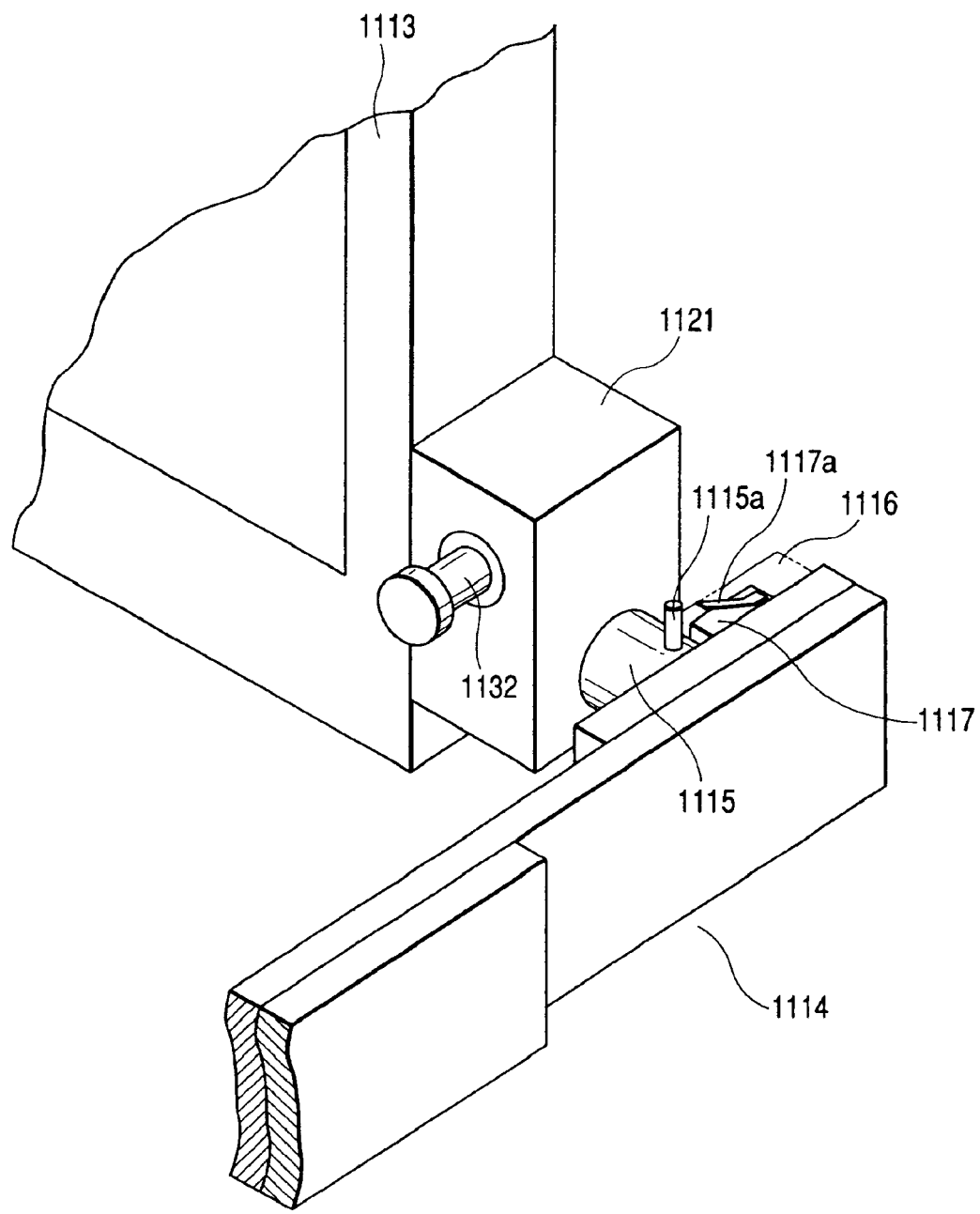
FIG. 13 is a partial view showing the configuration of a variation.

FIG. 13 shows a variation of the above-described embodiment. In the above-described embodiment, the movement of the top plate in the lateral direction is limited in case the position of the image receiver is not horizontal, or the change in the posture of the image receiver is limited by activating the solenoid according to the position of the top plate for limiting the rotation of the image receiver. In contrast, the embodiment shown in FIG. 13, instead of limiting the movement of the top plate or the rotation of the image receiver, is provided with protection means including a shock absorbing member, thereby preventing collision of the lateral edge of the top plate 1101 directly with the image receiving face of the image receiver 1113.

The specific mechanism will be explained in the following. As shown in FIG. 13, the block member 1121 is provided with a small shock absorbing member 1132 of which the head portion protrudes from the outer frame and the image receiving face of the image receiver 1113. The shock absorbing member 1132 is composed, for example, at least in the head portion thereof, of a flexible material such as rubber and is provided with a shock absorber utilizing a spring, thus absorbing the impact. In another form, there may be adopted a mechanism in which a shock absorbing member as explained in the foregoing is made to be protruded by an actuator, based on the signal from the aforementioned posture detector 1116. Such shock absorbing member 1132 is provided in such a position where the height of the head of the shock absorbing member becomes same as that of the top plate 1101 when the posture of the image receiver 1113 is changed to the vertical state. In such configuration, even if the operator erroneously switches the image receiver 1113 from the horizontal state to the vertical state while the top plate 1101 is shifted by a large amount to the lateral direction, the head of the shock absorbing member 1132 impinges on the lateral face of the top plate 1101 thereby absorbing the impact and the top plate 1101 is pushed, by the energy of collision, into a position without the interference. On the other hand, if the operator erroneously shifts the top plate 1101 in the lateral direction while the image receiver 1113 is in the vertical state, the top plate 1101 merely collides indirectly with the image receiver 1113 through the shock absorbing member. Therefore the image receiver 1113 is relieved from the direct impact so that the damage or failure in the image receiving face or in the top plate 101 can be avoided. The shock absorbing member 1132 may also be provided on the side of the top plate 1101, instead of on the side of the image receiver 1113. More specifically, the shock absorbing member may be provided in a position on the lateral face of the top plate 1101 and not interfering with the image receiving face of the image receiver 1113, and, in summary, the shock absorbing member may be provided in a position capable of avoiding the direct collision between the image receiving face of the image receiver 1113 and the lateral face of the top plate 1101.

The fourth embodiment of the present invention provides a radiographic apparatus, provided with a movable top plate and an image receiver which can be moved in position and/or posture relative to the top plate, capable of preventing the drawbacks such as damage or failure of the top plate or the image receiver, resulting from the interference between the top plate and the image receiver, thereby assuring high reliability and safety.

What is claimed is:

1. A radiographic apparatus, comprising:
   a top plate for supporting a subject;
   an image receiver for receiving a radiographic image of the subject;
   a first moving mechanism for varying a position relative to said top plate and/or posture of said image receiver;
   a second moving mechanism for vertically moving said top plate and said image receiver;
   a detector for detecting the position and/or posture of said image receiver; and
   a limiting unit adapted for limiting action of said second moving mechanism based on a detection result of said detector.

2. A radiographic apparatus according to claim 1, wherein said first moving mechanism comprises a guide mechanism for guiding movement of said image receiver.

3. A radiographic apparatus according to claim 1, wherein said first moving mechanism varies a position of said image receiver between a first position under said top plate and a second position at a side of said top plate.

4. A radiographic apparatus according to claim 3, wherein the limiting unit limits the action of said second moving mechanism in a case that said image receiver is at the second position.

5. A radiographic apparatus according to claim 3, wherein said limiting unit limits the action of said second moving mechanism in a case that said image receiver is at the second position and in a horizontal posture.

6. A radiographic apparatus according to claim 3, wherein said limiting unit limits a descending action of said second moving mechanism in a case that said image receiver is at the second position and in a horizontal posture.

7. A radiographic apparatus according to claim 1, wherein said image receiver comprises one of a radiographic film, a photostimulable phosphor sheet and a digital radiographic detector.

8. A radiographic apparatus comprising:
   a top plate for supporting a subject;
   an image receiver for receiving a radiographic image of the subject;
   a first moving mechanism for varying a position relative to said top plate and/or posture of said image receiver;
   a second moving mechanism for vertically moving said top plate and said image receiver;
   a detector for detecting an obstacle present under said image receiver; and
   a limiting unit for limiting descending action of said second moving mechanism based on a detection result of said detector.

9. A radiographic apparatus comprising:
   a top plate for supporting a subject and being movable in a direction;
   an image receiver for receiving a radiographic image of the subject;
   a moving mechanism for varying a position relative to said top plate and/or posture of said image receiver;
   a detector for detecting the position and/or posture of said image receiver; and
   a limiting unit for limiting movement of said top plate in a direction based on a detection result of said detector.

10. A radiographic apparatus according to claim 9, wherein said moving mechanism guides movement of said image receiver in a horizontal direction between a first position under said top plate and a second position at a side of said top plate, and also guides switching of said image receiver, at said second position, between a horizontal posture and a vertical posture.

11. A radiographic apparatus according to claim 10, wherein said limiting unit limits the movement of said top plate in the horizontal direction based on the posture of said image receiver.

12. A radiographic apparatus comprising;
   a top plate for supporting a subject and being movable in a direction;
   an image receiver for receiving a radiographic image of the subject;

a moving mechanism for varying a posture of said image receiver;

a detector for detecting the position of said top plate; and a limiting unit for limiting change in the posture of said image receiver based on a detection result of said detector.

13. A radiographic apparatus according to claim 12, wherein said moving mechanism guides movement of said image receiver in a horizontal direction between a first position under said top plate and a second position at a side of said top plate and also guides switching of said image receiver, at the second position, between a horizontal posture and a vertical posture.

14. A radiographic apparatus according to claim 13, wherein said limiting unit limits the change in the posture of said image receiver from horizontal to vertical.

15. A radiographic apparatus comprising;

a top plate for supporting a subject and being movable in a horizontal direction;

an image receiver for receiving a radiographic image of the subject;

a moving mechanism for varying a posture of said image receiver;

a first detector for detecting a posture of said image receiver;

a second detector for detecting a position of said top plate in the direction; and a limiting unit adapted for limiting movement of said top plate in the direction based on detection result of said first and second detectors.

16. A radiographic apparatus according to claim 15, wherein said moving mechanism guides movement of said image receiver in a horizontal direction between a first position under said top plate and a second position at a side of said top plate, and also guides switching of said image receiver, at the second position, between a horizontal posture and a vertical posture.

17. A radiographic apparatus according to claim 15, wherein said limiting unit limits the movement of said top plate in the direction in a case that said top plate is positioned within a predetermined range in the direction.

18. A radiographic apparatus comprising:

an image receiver of which position and posture are changeable, adapted for receiving a radiographic image of a subject;

a detector adapted for detecting the position of said image receiver and/or the posture of said image receiver; and a limiting unit adapted for limiting vertical movement of said image receiver based on a detection result of said detector.

19. A radiographic apparatus comprising:

an image receiver of which position and posture are changeable, adapted for receiving a radiographic image of a subject;

a detector adapted for detecting an obstacle present under said image receiver; and a limiting unit adapted for limiting vertical movement of said image receiver based on a detecting result of said detector.

20. A radiographic apparatus comprising:

a top plate adapted for supporting a subject and being movable in a horizontal direction;

an image receiver adapted for receiving a radiographic image of the subject;

a detector adapted for detecting a position of said image receiver and/or a posture of said image receiver; and a limiting unit adapted for limiting horizontal movement of said top plate based on a detection result of said detector.

21. A radiographic apparatus comprising:

a top plate adapted for supporting a subject and being movable in a horizontal direction;

an image receiver of which posture is changeable, adapted for receiving a radiographic image of the subject;

a detector adapted for detecting the position of said top plate; and a limiting unit adapted for limiting change in the posture of said image receiver based on a detection result of said detector.

* * * * *

UNITED STATES PATENT AND TRADEMARK OFFICE
CERTIFICATE OF CORRECTION

| | |
|---|---|
| PATENT NO. | : 6,928,145 B2 |
| APPLICATION NO. | : 09/770667 |
| DATED | : August 9, 2005 |
| INVENTOR(S) | : Masaaki Kobayashi |

It is certified that error appears in the above-identified patent and that said Letters Patent is hereby corrected as shown below:

Column 1,
Line 21, "generates" should read -- generate --.

Column 2,
Line 23, "e.g." should read -- e.g., --.

Column 7,
Line 56, "theses" should read -- these --.

Column 11,
Line 34, "plate 101" should read -- plate 1101 --.

Column 12,
Line 63, "comprising;" should read -- comprising: --.

Column 13,
Line 17, "comprising;" should read -- comprising: --.

Signed and Sealed this

Twenty-seventh Day of June, 2006

JON W. DUDAS
*Director of the United States Patent and Trademark Office*